(12) United States Patent
Balaji et al.

(10) Patent No.: US 7,743,391 B2
(45) Date of Patent: Jun. 22, 2010

(54) FLEXIBLE ARCHITECTURE COMPONENT (FAC) FOR EFFICIENT DATA INTEGRATION AND INFORMATION INTERCHANGE USING WEB SERVICES

(75) Inventors: Ekambaram Balaji, Portland, OR (US); Balaji Ganesan, Fairview, OR (US); Chandramouli Srinivasan, Gresham, OR (US)

(73) Assignee: LSI Corporation, Milpitas, CA (US)

( * ) Notice: Subject to any disclaimer, the term of this patent is extended or adjusted under 35 U.S.C. 154(b) by 831 days.

(21) Appl. No.: 10/620,581

(22) Filed: Jul. 15, 2003

(65) Prior Publication Data

US 2005/0015439 A1    Jan. 20, 2005

(51) Int. Cl.
G06F 3/00 (2006.01)
G06F 9/44 (2006.01)
G06F 9/46 (2006.01)
G06F 13/00 (2006.01)

(52) U.S. Cl. ...................... 719/328; 719/313

(58) Field of Classification Search ................. 719/313, 719/328; 709/246
See application file for complete search history.

(56) References Cited

U.S. PATENT DOCUMENTS

| | | | |
|---|---|---|---|
| 6,880,125 B2 * | 4/2005 | Fry | 715/513 |
| 6,912,538 B2 * | 6/2005 | Stapel et al. | 707/101 |
| 6,948,174 B2 * | 9/2005 | Chiang et al. | 719/319 |
| 6,964,053 B2 * | 11/2005 | Ho et al. | 719/319 |
| 2003/0065805 A1 * | 4/2003 | Barnes, Jr. | 709/231 |
| 2003/0204645 A1 * | 10/2003 | Sharma et al. | 709/328 |
| 2004/0015366 A1 * | 1/2004 | Wiseman et al. | 705/1 |
| 2004/0054969 A1 * | 3/2004 | Chiang et al. | 715/513 |
| 2004/0064428 A1 * | 4/2004 | Larkin et al. | 707/1 |

OTHER PUBLICATIONS

Glass, Graham, "Web Services Building Blocks for Distributed Systems," Prentice Hall PTR, 2002; pp. 3-7, 71-103.*
Umar, Amjad, "Object-Oriented Client/Server Internet Environments," Prentice Hall PTR, 1997; pp. 165-169.*
Ning et al., "Design and Implementation of the DTD-based XML Parser," Proceedings of ICCT2003, Apr. 2003; retrieved from IEEE Xplore Oct. 6, 2008.*

* cited by examiner

Primary Examiner—Meng-Ai An
Assistant Examiner—Nathan Price
(74) Attorney, Agent, or Firm—William W. Cochran; Cochran Freund & Young LLC

(57) ABSTRACT

A flexible architecture component for providing data integration and exchange between a plurality of client applications is disclosed. The client applications are coupled to a network and access respective data sources, wherein the data sources of each of the client applications may be stored in different formats and are not directly accessible by the other client applications. Aspects of the present invention include providing an adapter API that provides a first set of methods for the client applications to use to translate data into XML. Each of the client applications is then modified to invoke the methods in the adapter API to convert data in their respective data sources into XML format and to have the XML formatted data imported into a database on a server, thereby standardizing the data from the data sources. In a further embodiment, a second set of methods is included in the adapter API for the same or different client applications to use that export data from the database into the client applications using standard Web services.

13 Claims, 6 Drawing Sheets

FAC::Creat Doc

Arguments: None
Returns: Handle to Document Object

FAC::CreateRoot

Arguments:
   doc - Document object
   rootName - Name of the root element
Returns: Handle to Root element object Creates the root element object and returns a handle to the object.

FAC::CreateEntity

Arguments:
   parentObj - Handle to the parent object
   elemName - Name of the new element to be created Returns: elemObj - Handle to the created element

FAC::CreateAttribute

Arguments:
   parentObj - Handle to the parent object
   attrName - Name of the new attribute to be created
   attrValue - Value of the new attribute to be created Returns: None

FAC::printDoc

Arguments:
   doc - Handle to the document object ( The one which first got created from CreateDoc)
   fileName - Name of the output file Returns: None

Figure 5A

*package require FAC*

*set doc [ FAC::CreateDoc ]*

*set rootHandle [ FAC::CreateRoot $doc "Root" ]*

*FAC::CreateAttribute $rootHandle "Attr1" "Val1"*
*FAC::CreateAttribute $rootHandle "Attr2" "Val2"*

*set child1Handle [ ::FAC::CreateEntity $rootHandle "Child1" ]*

*FAC::CreateAttribute $child1Handle "cAttr1" "Val1"*
*FAC::CreateAttribute $child1Handle "cAttr2" "Val2"*

*set child1inst [ FAC::CreateEntity $rootHandle "Child1" ]*

*FAC::CreateAttribute $child1inst "cAttr1" "Val3"*
*FAC::CreateAttribute $child1inst "cAttr2" "Val4"*
 *set child2Handle [ FAC::CreateEntity $rootHandle "Child2" ]*

*FAC::CreateAttribute $child2Handle "c2Attr2" "Val1"*
*FAC::CreateAttribute $child2Handle "c2Attr3" "Val2"*

*FAC::printDoc $doc "my.xml"*

Sample Output

```
<?xml version='1.0'?>
<!DOCTYPE Root>
<Root Attr1="Val1" Attr2="Val2">
    <Child1 cAttr2="Val2" cAttr1="Val1"/> <Child1 cAttr2="Val3" cAttr1="Val4"/>
    <Child2 c2Attr2="Val1" c2Attr3="Val2"/>
</Root>
```

Figure 5B

FLEXIBLE ARCHITECTURE COMPONENT (FAC) FOR EFFICIENT DATA INTEGRATION AND INFORMATION INTERCHANGE USING WEB SERVICES

FIELD OF THE INVENTION

The present invention relates to Enterprise Application Integration (EAI), and more particularly to the integration of data across multiple client applications and a framework for sharing the data between the client applications.

BACKGROUND OF THE INVENTION

Due to the evolution of the Internet and related technologies, transfer of data and sharing of information over the World Wide Web has become a very common phenomenon. The web provides a common interface for applications to interchange information, however, data exist in various forms and may be scattered in different platforms and locations. The challenge is to provide an ability to integrate the diverse, distributed data and information sources both within and outside an enterprise into a single coherent framework while meeting scalability, performance and business process requirements.

The plans, methods, and tools aimed at modernizing, consolidating, and coordinating the computer applications in an enterprise is referred to as Enterprise Application Integration (EAI). Typically, an enterprise has existing legacy applications and databases and wants to continue to use them while adding or migrating to a new set of applications that exploit the Internet, e-commerce, extranet, and other new technologies. EAI may involve developing a new total view of an enterprise's business and its applications, seeing how existing applications fit into the new model, and then devising ways to efficiently reuse what already exists while adding new applications and data.

EAI is one of the biggest challenges for large high-tech companies. A major component of the integration effort involves development of data interchange system and tools that can seamlessly transfer data among various systems within the organization. The primary goal of such systems and tools is to provide a generalized software infrastructure that can support various data sources, allow for consumption of data by downstream tools and define a process by which multiple systems can communicate using a supplier, consumer relationship. This needs to be accomplished taking into account co-existence of new and old (legacy) data sources, formats and systems already in place.

One example of an organization that needs data integration is a chip manufacturer that creates custom integrated circuits having specialized functions. To achieve the functions desired, the chips may be designed using software applications, such as Electronic Design Automation (EDA) software tools. The software applications are typically run on different computers may use and store different types of data. The chip manufacturer may have a need to integrate all of the design data, such that it can be retrieved for future analysis. Examples of the type of data that needs to be analyzed may include historical trends, design metrics, targets for process optimization, and so on. The problem is that not all applications have access to the data produced by applications running on different computers. And even where the computers are networked together as clients, the client applications are not compatible with each other in terms of how the data is formatted.

Enterprises, such as the example chip manufacturer, face many problems with respect to implementing enterprise level integration. One of the biggest problems is keeping abreast of the evolution of business applications. Critical business processes and systems evolve rapidly over time and hence there is major need for applications to be scalable. The various data requirements for applications change over time and hence the data interchange tools and methods needs to be generic and scalable. The example chip manufacturer, for instance, may need a way to integrate the data from the data sources in a manner such that the collection of data can evolve over time to include additional types of information from other sources, such as packaging and manufacturing data.

The second major problem with enterprise level data integration is that there is no standardized, modular, software toolkits that client applications can use out of the box for exporting and importing data across applications. There are some high-end third party solutions for this problem, but there are no low cost alternatives and they come with major deployment costs for bringing them online. Further compounding the problem is the fact that in some businesses, such as the example chip manufacturer, the people who must integrate the client applications with the third party tools are often design engineers, not programmers.

Also, the current solutions may provide a way of integrating existing data but there is no standard available for generating and transferring the data easily for applications to adopt. Although XML serves as a standard medium for transferring data from one system to another, it adds a lot of overhead for applications to implement XML specific data generation methods. Many application's developers may not have the knowledge to develop XML documents and the technology required to integrate the data. Even if the data exists in a transferable form, the issue of exporting the data into a data warehouse still exists.

Last, but not least, is that in current business environments, organizations do not have a lot of manpower, time, and material to invest in solving data integration problems. So any solution pursued needs to be cost effective, be able to be developed and deployed expeditiously and should minimize any impact on existing flows and methodologies.

There are some commercially available products built on web services architecture that attempt to address some of these problems. IBM's WebSphere Application Server provides a scalable transaction engine for dynamic e-business applications. The Open Services Infrastructure allows companies to deploy a core-operating environment that works as a reliable foundation capable of handling high volume secure transactions and Web services. Microsoft's BizTalk Server provides organizations with the server, tools, adapters, and vertical accelerators needed to integrate and automate their business. And TIBCO's web services solutions provide enterprise level integration and ability to create "Compound Web Services" that integrates web services.

Although each of the above-mentioned solutions addresses the problem of integrating data and communicating across applications, the existing solutions have several disadvantages. First, these solutions do not address the problem of how the data collected from the various data sources should be standardized and collected from the client applications. Second, all the above-mentioned solutions come with very high deployment costs and rely upon a business model based on professional turnkey services for integration. The cost of technology ramp-up of applications that need to make use of this is very high.

The third problem is that the overhead of integrating these solutions with individual applications is difficult because most applications have to be adjusted to support a Service Oriented Architecture (SOA), which these solutions expect. In addition, the overhead of integration is equally complex regardless of the scope and size of the applications.

Although Web services are deemed to provide a standard means of communication among different software applications, the learning curve of programmers to implement web services is very high. Also, organizations need to invest a considerable amount of both time and money to enable the use of web services, regardless of the size and complexity of the applications.

Accordingly, what is needed is an approved method and system for performing enterprise-level data integration. The present invention addresses such a need.

SUMMARY OF THE INVENTION

The present invention provides a flexible architecture component for providing data integration and exchange between a plurality of client applications. The client applications are coupled to a network and access respective data sources, wherein the data sources of each of the client applications may be stored in different formats and are not directly accessible by the other client applications. Aspects of the present invention include providing an adapter API that provides a first set of methods for the client applications to use to translate data into XML. Each of the client applications is then modified to invoke the methods in the adapter API to convert data in their respective data sources into XML format, and to have the XML formatted data imported into a database on a server, thereby standardizing the data from the data sources. In a further embodiment, a second set of methods is included in the adapter API for the same or different client applications to use that are invoked to export data from the database into the client applications using standard Web services.

According to the method and system disclosed herein, the adapter API is part of the flexible architecture component (FAC) of the present invention. The FAC enables multiple client applications to submit their data to a server in standard format, such as XML, for storage in a database, and to extract the data of other client application from the database using web services in a manner that does not require XML or web service programming expertise.

BRIEF DESCRIPTION OF THE DRAWINGS

FIG. 5A is a diagram illustrating the method definitions of the Writer API of the adapter for a sample TCL based application.

FIG. 5B illustrates example generation logic that makes use of the Writer APIs described in FIG. 5A.

DETAILED DESCRIPTION OF THE INVENTION

The present invention relates to a method and system for providing enterprise-level data integration. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention solves the enterprise level data integration problem by providing a complete, but simplified, low-cost infrastructure solution referred to herein as a Flexible Architecture Component (FAC), that facilitates XML data generation, transport, storage and retrieval of data across applications for the import and export of the data from/to different systems.

The present invention provides enterprises with an easy to adopt software integration methodology built on the popular web services architecture along with a lightweight integration process. For example, individual groups in an organization can use this methodology to add data to an enterprise portal without knowledge of XML or web services in order to share resources across the enterprise and build efficient business processes. The FAC of the present invention simplifies the data integration process and minimizes the amount of complex technology groups need to learn, thereby reducing ramp-up time and cost. Although the present invention will be described in terms of a preferred embodiment in which XML is used, the present invention may be implemented with any markup language, such as DSML and SGML, for instance.

Figure 1:
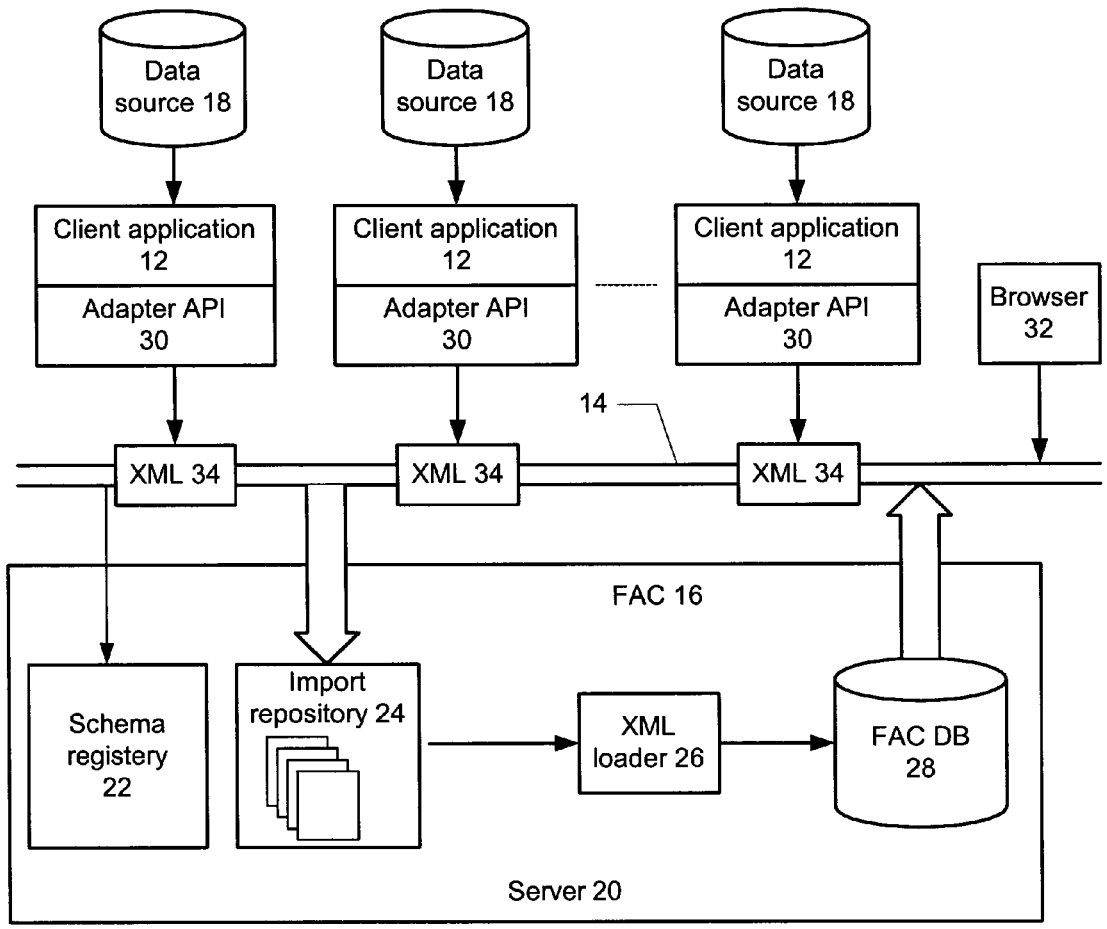
FIG. 1 is a conceptual block diagram illustrating a flexible architecture component system in accordance with a preferred embodiment of the present invention.

FIG. 1 is a conceptual block diagram illustrating a flexible architecture component system in accordance with a preferred embodiment of the present invention. The FAC system 10 includes multiple client applications 12, and a flexible architecture component (FAC) 16 coupled to a network 14. The client applications 12 may be executed on the same or different computer systems (not shown) and each client application 12 has access to one or more data sources 18. The data sources 18 may store different types of data and/or in different formats from that of the other data sources 18, making the data generally inaccessible to client applications 12 that utilize a different type or format of data.

The FAC 16 of the present invention comprises a server 20, a schema registry 22, an import repository 24, an XML loader 26, and an FAC database 28. The FAC 16 acts as an enterprise portal and data repository so that the data from the various data sources 18 can be integrated in a standard format and exchanged across the client applications 12.

Prior to using the FAC 16, the data source 18 of each client application 12 must be registered with the schema registry 22 to specify the syntax and semantics of the data via a schema definition. In a preferred embodiment, the data sources 12 are registered with the schema registry 22 on a server web site accessed by a Web browser 32. Information regarding the schema may be entered in a table that has fields such as, Tag Name, Tag Type, Tag Legal Values, and so on.

The client applications 12 are also provided with an adapter 30 that enable the client applications 12 to convert the data from their respective data sources 18 into XML formatted data and to then import the XML formatted data into the FAC 16 for storage in the FAC database 28. The adapter 30 includes an XML API, which utilizes the XML schema defined for the data source 18 and provides a set of methods for the applications 12 to call. In a preferred embodiment, the XML API's 18 store the XML data in an XML file 34 and transmit the XML file 34 to the import repository 24 for temporary storage. Thereafter, the XML loader 26 parses the XML files 34 in the import repository 24 and stores the data in the FAC database 28.

According to the present invention, any client application 12 may be modified to utilize the adapter 30 to retrieve or otherwise export data from the FAC database 28 into the application 12. Any such client application 12 that has been modified to include the adapter 30 for importing data into the FAC 16 is referred to as a supplier client application 12. Any client application 12 that retrieves data from the FAC database 28 is referred to herein as a consumer client 12. A particular client application 12 may be modified to be a supplier application, a consumer application, or both.

The adaptors 30 of the FAC system 10 make the use of XML transparent to users of the client applications 12 and eliminates the need for programmers to have a deep understanding of XML or web services to integrate the client applications 12 with the system 10. Other advantages afforded by the FAC 16 include the ability to import external design data sources into the database 28 in XML format in a manner that meets pre-defined requirements. The FAC system 10 also provides infrastructure and a transport vehicle to collect, manage and store the same information in the database 28 in context to the parent hierarchy of the data source. A further advantage is that the API 30 of FAC system 10 provides application developers the ability to write customized queries and data analysis modules in respective functional areas and to submit the queries to the database 28 for integration. In addition, the FAC system 10 facilitates a lightweight integration process to register and integrate the applications 12 with FAC infrastructure. Moreover, the FAC system 10 provides an ability to publish and provide the adapter 30 to applications 12 for access to data through a simple API built on top of web services architecture.

Figure 2:
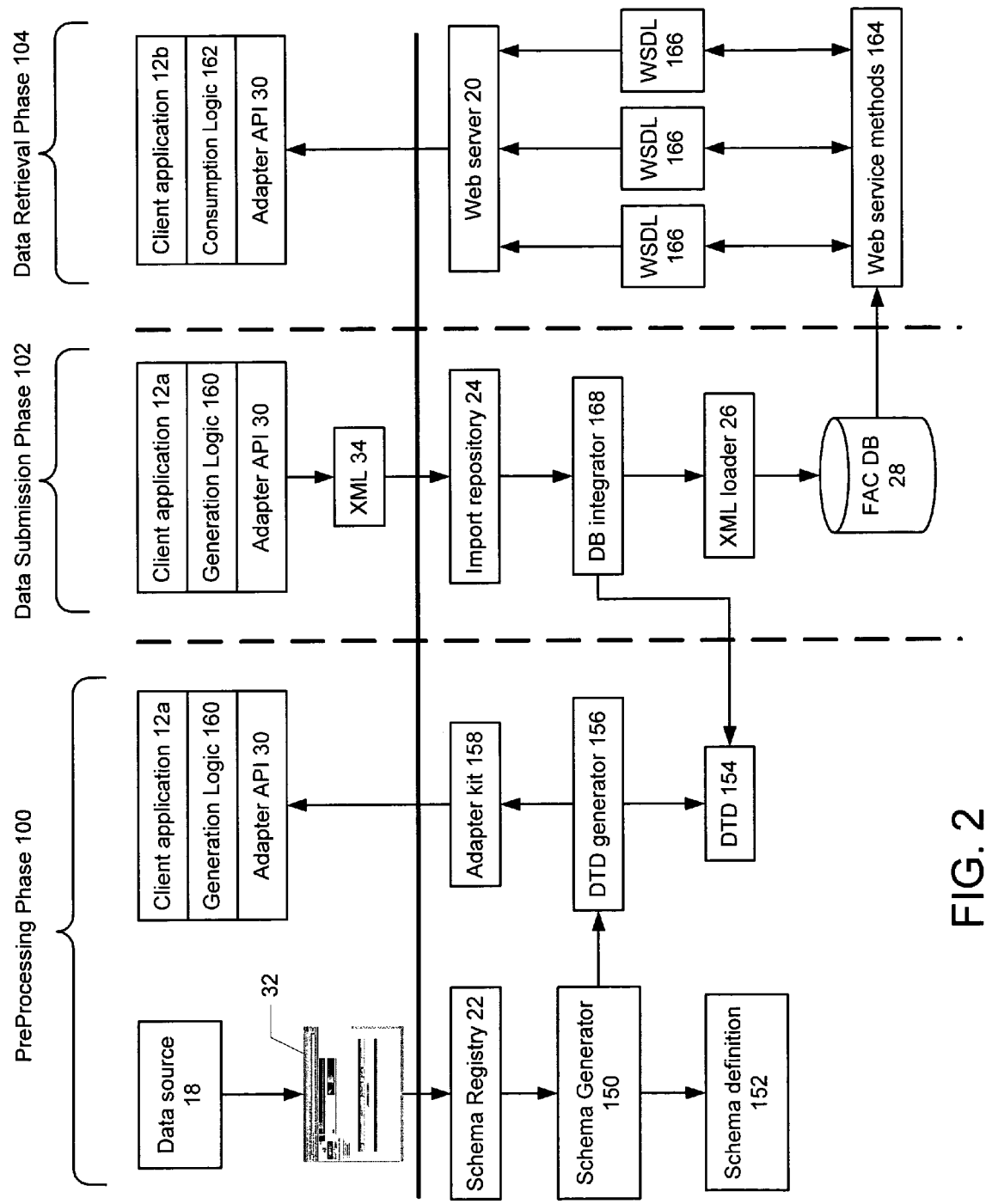
FIG. 2 is a diagram illustrating in further detail a process flow description of the FAC system and the process involved with integrating a client application with the FAC enterprise portal.

FIG. 2 is a diagram illustrating in further detail a process flow description of the FAC system 10 and the process involved with integrating a client application 12 with the FAC enterprise portal 16. The FAC process flow includes three major phases: a preprocessing phase 100, a data submission phase 102, and a data retrieval phase 104. The preprocessing phase 100 includes registering the data sources 18 and modifying the client applications 12 to become supplier applications 12a and/or consumer applications 12b. In the data submission phase 102, supplier applications 12a are executed and import data from the data sources 18 into the FAC database 28. In the data retrieval phase 104, consumer applications 12b are executed to export data from the FAC database 28.

Referring now to the preprocessing phase 100, the first step is to register a data source 18 with the schema registry 22 on the server 20 via a Web interface 32. As described above, an operator provides a schema definition for the data source 18 by entering tag information regarding the schema in a table. Thereafter, a schema generator 150 uses the information to specify the syntax and semantics of the data source 18 in an XML schema definition 152. A DTD generator 156 generates a Document Type Definition (DTD) 154 that closely matches the data source 18 registered with the schema registry 22. The DTD 154, once constructed, is managed by a database integrator application 168 and is used to validate incoming XML files 34. In a preferred embodiment, the DTD 154 includes a mandatory set of default tags, which facilitate the integration of the new data source into the FAC 16.

In a preferred embodiment, the schema generator 150, the DTD generator 156, and the database integrator 168 are software tools that are part of the FAC software suite. In addition to the schema definition 152, the schema registration may also require the specification of additional information about the data source 18, such as contact information, for data management purposes and helping implement an efficient table design. It is a requirement that generator applications 150 and 156 generate data consistent with specifications provided in the schema registry 22. Once registration is complete, the client application is registered as a supplier client application 12a with the server 20.

The next step in the process is to insert the adapter 30 into the code of the supplier applications 12a. The first step in this process is to download from the server 20 an adapter builder software kit 158, which contains the adapter 30, and loading the adapter software kit 158 on the computer on which the client application 12 is run. The adapter 30 is a native software object that may also be referred to as a data interface or data driver.

In a preferred embodiment, the adapter 30 includes two sets of XML API's. The first set is a Writer API that includes methods for creating XML files 34 from data computed by supplier client applications 12a. The second set of API's is a Reader API that includes methods invoked by consumer client applications 12b to access the FAC database 28 (e.g., retrieving design statistics from the database for use in the targeted application). In some cases, consumer client applications 12b can be different from supplier applications 12a that import data to the FAC 16.

In a preferred embodiment, the logic used to compute statistics or design data is the responsibility of the supplier client application 12a. Therefore, the client application 12a is modified to insert calls to the Writer methods contained in the adapter 30 in the appropriate places of the code in order to have the data in the data source 18 converted into XML Name/Value pairs and stored in an XML file 34. These calls are referred to as the generation logic 160.

The adapter 30 may be developed and published by the FAC 16 using an API interface part of web services, such as Web Services Description Language (WSDL). WSDL describes the protocols and formats used by a web service. The API interface understands methods in WSDL and thereby expose them to the client applications 12a that will be producing the desired data. The Writer API is a very simple interface, such that the client application 12a can convert the data source 18 with relative ease to populate the database 28. Thus, the adapter 30 interface of the present invention hides the details from the user of the API as much as possible.

Figure 3:
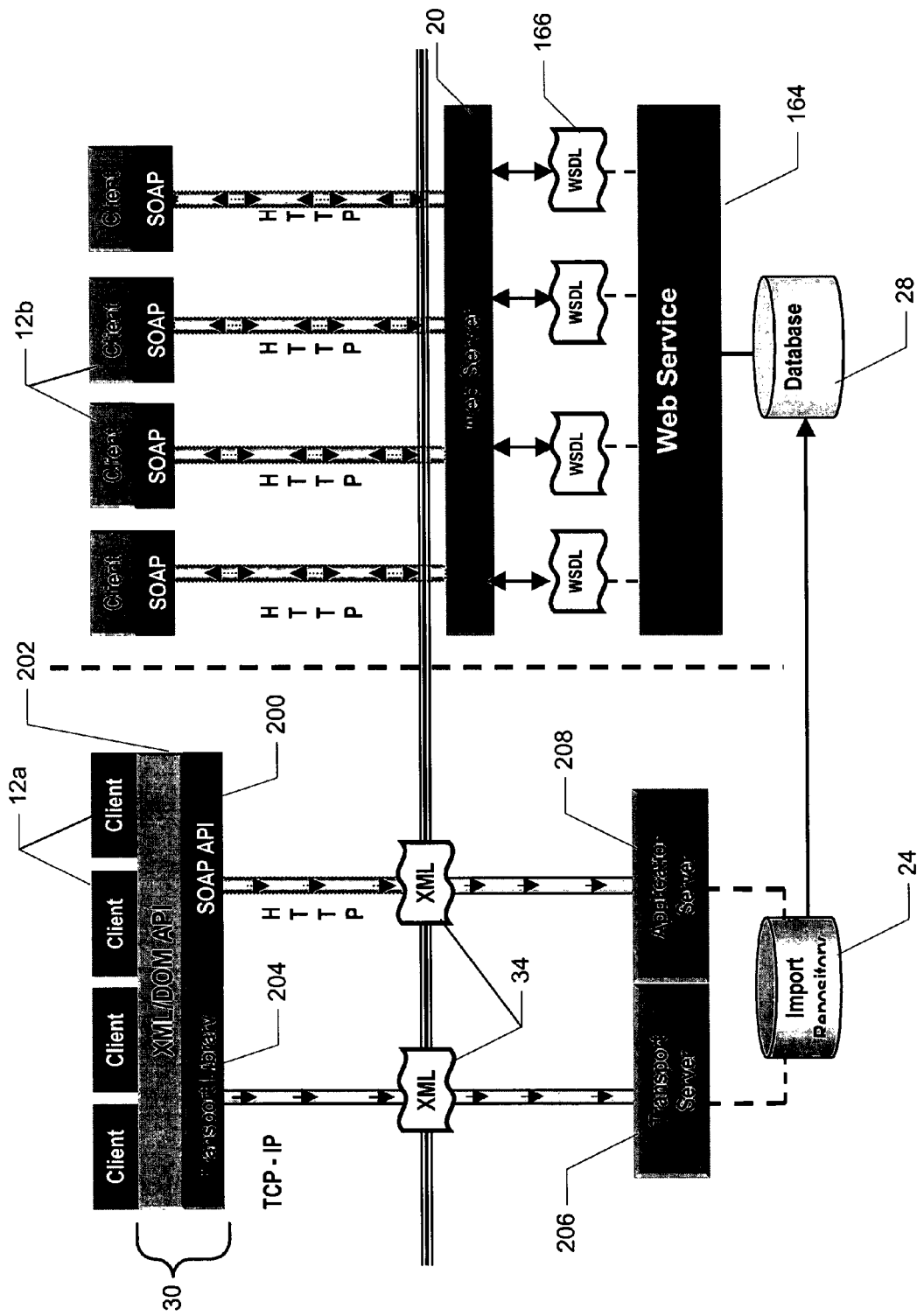
FIG. 3 is a diagram showing one implementation of the FAC system.

The components of the adapter 30 are shown in further detail in FIG. 3, which is a diagram showing one implementation of the FAC system 10. The left side of the diagram shows the processes involved in the data generation, collection and integration by supplier applications 12a. The right side shows the publishing of the data through web services for applications to consumer applications 12b.

Referring to the left side of the diagram, the adapter 30 may include a standardized API 200, an XML API 202, a transport library 204, and verification code (not shown). The standardized API 200 is part of a web services or software library and includes the SOAP protocol libraries and other TCP/IP, HTTP libraries that are required for implementation as part of the web services methodology. This abstracts the applications 12a from the web services technology and other complex software compatibility processes. The implementation is specific to a language and platform, which is developed and supported as part of the FAC methodology.

The XML API 202 is built on top of a Document Object Model (DOM) structure and provides a set of simple methods for the applications 12a to use to translate the data from the data source 18 to a form consistent with the DTD 154 generated during the schema registry phase. As is well known in the art, a DOM describes how some XML parsers return the information contained in an XML document. The elements of the XML document are described as nodes of a tree that can be traversed by a program.

The verification code verifies the XML data against DTD defined in schema registry 22, and the transport library 204 comprises routines for transferring the XML generated data into the import repository 24. If the TCP/IP protocol is used to transfer the XML files 34 to the FAC 16, then the XML files 34 are received by a transport server 206. If the HTTP protocol is used to transfer the XML files 34 to the FAC 16, then the XML files 34 are received by an application server 206.

In a preferred embodiment, platform/language specific implementations are made to the adapter builder kit 158 to support applications 12 implemented in different platforms (such as perl, tcl/tk, C, C++, Java etc).

Another important part of adapter 30 API is how the construction of TAGs occurs. It should be noted that this construction is independent of the XML schema or structure (which is more hierarchical) of the data source 18. The FAC adapter software kit 158 takes the burden of ensuring that the inserted TAGs conform to the DTD hierarchical structure. This is done using the TAGIds. During the schema registry process, each XML tag is assigned a unique TAGIds.

Referring again to FIG. 2, after a data source 18 has been registered with the schema registry 22 and the client application 12a has been modified to use the adapter 30, the client application 12a is run, which begins the data submission phase 102. When the client application 12a is executed, the generation logic 160 makes calls to the Write methods of the adapter 30. In response, the writer methods convert the data into XML format in memory and once completed, all the XML format data is saved in an XML file 34, which is then submitted to the import repository 24.

In order for FAC to provide integration with several data sources 18, the FAC 16, uses the import repository 24 for collecting all arriving XML files 34 generated by the client applications 12a. The import repository 24 provides the following advantages: 1) It provides a separate collection of XML files 34 to ensure that foreign data sources 18 can be completely validated and recorded before entering the database. 2) A separate staging area keeps the XML files 34 in isolation of the operational database 28, and hence minimizes the impact on the integrated data warehouse (if things go wrong). 3) A separate staging area for applications 12 provides an ability to track transactions independent of the database 28.

Once XML files 34 are deposited to the import registry 24, the next step in the process is database integration in which the data from the XML files 34 in the import repository 24 is loaded into FAC database 28. It should be noted that a database administrator must perform a table design process prior using the FAC database 28. This involves designing the logical and physical data models for the new imported data. This includes entity design and building relationship of this data with preexisting data tables in a relational database. This step needs to be done manually to ensure referential and relational integrity. Once tables are designed, a data interface layer (SDB API) may be used to create the tables and other objects in the database.

In operation, after files 34 have been deposited into the import repository 24, the first step of the database integration is for the database integrator 168 to validate the XML file 34 against the corresponding DTD 154. Thereafter, the XML loader 26 parses each of the XML files 34 in the import repository 24 and stores the name/value pairs in the FAC database 28 according to the data hierarchy of the original data source 18 as specified by the DTD 154.

The next step of the FAC process is the data retrieval phase 104. The present invention enables the consumer client applications 12b to submit queries to the newly integrated data sources in the FAC database 28 by inserting calls to the Reader API (part of web services) of the adapter 30. The Reader API calls are shown in FIG. 2 as consumption logic 162, and are generally written as the logic for queries and analysis.

Once the data is integrated into the database 28 and the analysis/query capabilities are defined, the analysis can be published as web services methods for consumption by applications. The applications 12a that generated the data can set the privileges of the consumers and can choose to either keep it public or restrict the usage of consumers. The publishing could be done through a UDDI or through interaction with an FAC development team depending on the type of methods published. As shown in FIGS. 2 and 3, the export of data from the database 28 is performed by the Reader API is accomplished using standard Web services 164, WSDL 166, and the server 20. Because the Reader API of the adapter 30 enables the applications 12b to gain programmatic access to the data, a wide range of information sharing across applications 12 is provided.

Figure 4:
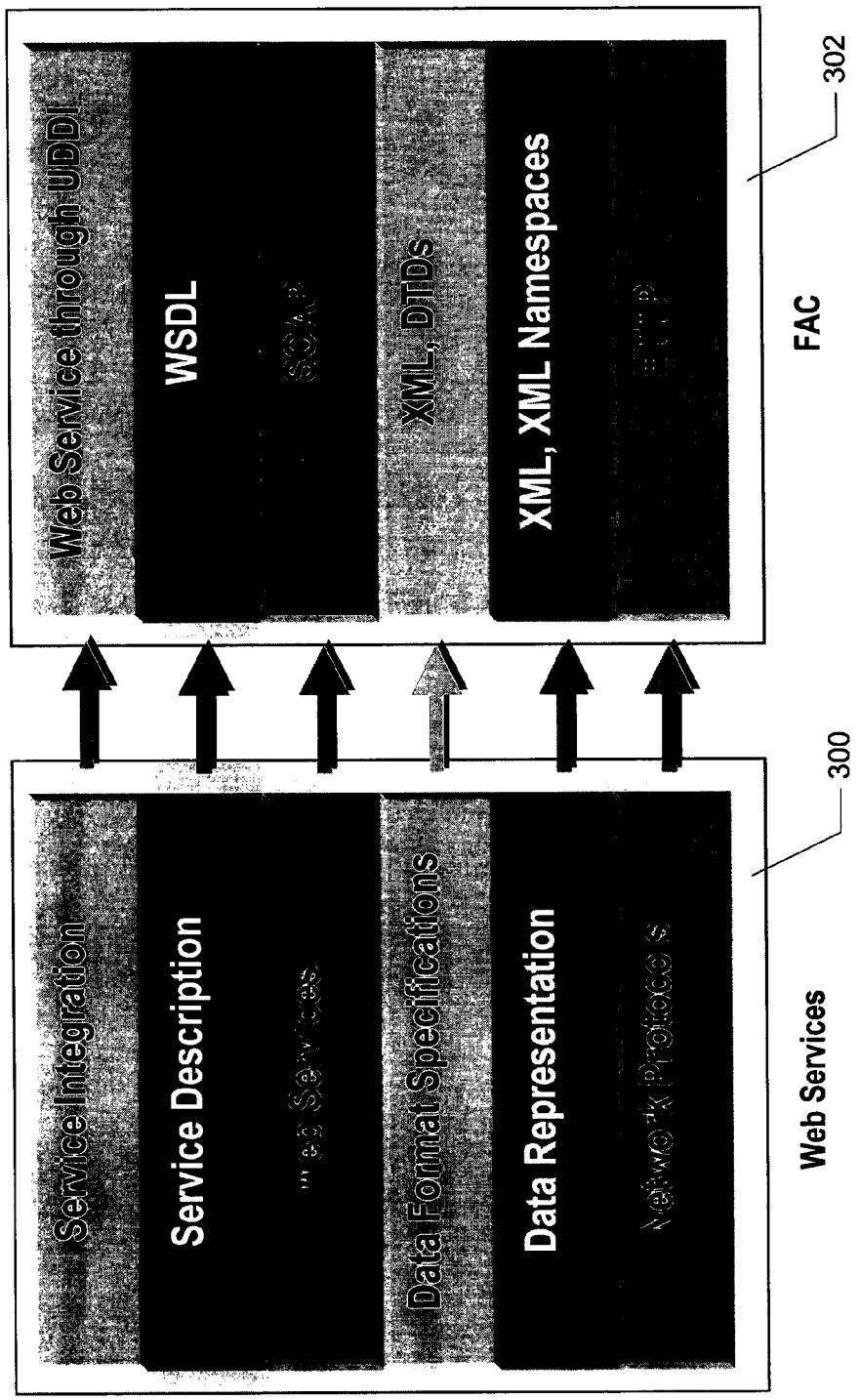
FIG. 4 is a diagram showing the layered architecture of standard web services and those layers are implemented by the FAC 16 in accordance with a preferred embodiment of the present invention.

FIG. 4 is a diagram showing the layered architecture of standard web services and those layers are implemented by the FAC 16 in accordance with a preferred embodiment of the present invention. Stack 300 shows the various components that constitute a web service, and stack 302 describes the specific implementation of the corresponding components in FAC 16.

FIG. 5A is a diagram illustrating the method definitions of the Writer API of the adapter 30 for a sample TCL based application. The methods listed will have separate implementations based on the language and platform but is maintained and developed as part of the FAC infrastructure. The example Writer API includes the following methods: CreateDoc, CreateRoot, CreateEntity, CreateAttribute, and PrintDoc.

The CreateDoc method is called by an application 12a to create a root node of a new DOM document, using the default DOM implementation. The document element type may be specified as an argument, in which case that element is created. The return value is a token referring to the root node of the newly created document.

When the CreateRoot method is called, a root element object is created and a handle to the object is returned. The CreateEntity method is called to create an element node as a child of the given node specified by token. The token must be a node of type element, document or documentFragment. The new child element is added as the last child of token's list of children. The new element's type is given by the parentObj argument. The new element is created with an empty attribute list.

The CreateAttribute method is called to create an attribute node for the given element specified by token. Parentobj must be a node of type element. This method sets the attribute value of the attribute given by name. If the attribute already exists then its value is replaced, otherwise the attribute is created.

The method PrintDoc is called to write out the DOM structure created for the document object passed to the file specified. It also automatically submits the file to the FAC server 20.

Using these methods of the Writer API, client applications 12*a* are shielded from the implementation methodology, allowing programmers to focus on how to use these methods to generate XML versions of the desired data.

FIG. 5B illustrates example generation logic 160 that makes use of the Writer APIs described in FIG. 5A. The logic begins by invoking the CreateDoc method to create a document called "doc." Thereafter, a root element, "Root," is created using the CreateRoot method, and two name/value attribute pairs are added to "Root" using the CreateAttribute method. A child entity called "Child1" is created using the CreateEntity method, and four name/value attribute pairs are added to it. A child entity called "Child12" is created using the CreateEntity method, and two name/value attribute pairs are added to it. The entities and name/value pairs are stored in a DOM structure in memory. Finally, the PrintDoc method is called to create and output an XML file called "my.xml," which is shown in the sample output file.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for providing data integration and exchange between a plurality of client applications over a network, wherein each of the client applications access a respective data source, the method comprising:
   (a) providing an adapter AP at each of the client applications that provides a first set of methods for the client applications to use to translate data in the respective data sources into XML format, wherein the data sources of each of the client applications store different types of data in different formats, wherein the data from a given data source is not directly accessible by the other client applications that utilize data of a different type or format;
   (b) modifying each of the client applications to invoke the first set of methods in the adapter API to convert the data in the respective data sources into XML format according to a registered schema definition and saving the XML format data from the respective data sources in XML files;
   (c) submitting each of the XML files to an import repository at a server, wherein the import repository is separate from a database at the server;
   (d) prior to storing data from the XML files in a database, validating each of the XML files in the import repository against a document type definition (DTD) corresponding to the respective data sources;
   (e) parsing the validated XML files in the import repository and storing name/value pairs in a database at the server according to a hierarchy specified by the corresponding DTD, thereby standardizing the data from the data sources of the client applications; and
   (f) including a second set of methods in the adapter API for the client applications that provides consumption logic and methods for automatically exporting data defined in a Web-based schema registry, from the database into the client applications using Web services.

2. The method of claim 1 further including: registering the respective data sources with a schema registry in order to create the schema definition and the document type definition (DTD).

3. The method of claim 2 wherein the adapter API includes an XML API comprising the first set of methods and the second set of methods, wherein the first set of methods comprises a Writer API, and the second set of methods comprises a Reader API.

4. The method of claim 3 wherein the client applications are modified with generator logic that makes calls to methods comprising the adapter API, wherein once called, the Writer API converts data into the XML format in memory and saves the XML format data in the XML files, which are then transported to the server.

5. The method of claim 4 wherein the adapter further includes verification code that verifies the generated XML data against the DTD defined in schema registry.

6. A computer-readable medium containing program instructions for providing data integration and exchange between a plurality of client applications over a network, wherein each of the client applications access a respective data source, the program instructions for:
   (a) providing an adapter API at each of the client applications that provides a first set of methods for the client applications to use to translate data in the respective data sources into XML format, wherein the data sources of each of the client applications store different types of data in different formats, wherein the data from a given data source is not directly accessible by the other client applications that utilize data of a different type or format;
   (b) modifying each of the client applications to invoke the first set of methods in the adapter API to convert the data in the respective data sources into XML format according to a registered schema definition and saving the XML format data from the respective data sources in an XML file;
   (c) submitting each of the XML files from the client applications to an import repository at a server, wherein the import repository is separate from a database at the server;
   (d) prior to storing data from the XML files in a database, validating each of the XML files in the import repository against a document type definition (DTD) corresponding to the respective data sources;
   (e) parsing the validated XML files in the import repository and storing name/value pairs in a database at the server according to a hierarchy specified by the corresponding DTD, thereby standardizing the data from the data sources of the client applications; and
   (f) including a second set of methods in the adapter API for the client applications that provides consumption logic and methods for automatically exporting data defined in a Web-based schema registry, from the database into the client applications using Web services.

7. The computer-readable medium of claim 6 further including the instruction of: registering the respective data sources with a schema registry in order to create the schema definition and the document type definition (DTD).

8. The computer-readable medium of claim 7 wherein the adapter API includes an XML API comprising the first set of methods and the second set of methods, wherein the first set of methods comprises a Writer API, and the second set of methods comprises a Reader API.

9. The computer-readable medium of claim 8 wherein the client applications are modified with generator logic that makes calls to methods comprising the adapter API, wherein once called, the Writer API converts data into the XML format in memory and saves the XML format data in the XML files, which are transported to the server.

10. The computer-readable medium of claim 9 wherein the adapter further includes verification code that verifies the generated XML data against the DTD defined in schema registry.

11. A data integration system, comprising:

a network;

a server coupled to the network, the server including a schema registry, an import repository, an XML loader, a database, and a published adapter API at each of the client applications that provides a first set of methods for translating data in respective data source into XML format; and a plurality of client applications coupled to the network and in communication with the server, wherein each of the client applications access the respective data source, and wherein the data sources of each of the client applications store different types of data in different formats, wherein the data from a given data source is not directly accessible by the other client applications that utilize data of a different type or format, and wherein at least a portion of the client applications includes a corresponding schema definition and document type definition (DTD) registered with the schema registry, and the portion of the client applications includes generation logic for making calls to the first set of methods in the adapter API, such that data in the respective data sources are converted into XML format according to the corresponding schema definition and stored in XML files, wherein each of the XML files is submitted to the import repository at the server, wherein the import repository is separate from a database at the server, wherein each of the XML files in the import repository is validated against the corresponding DTD prior to storing data from the XML files in a database, and wherein the XML loader parses the validated XML files in the import reposition and stores name/value pairs in the database at the server according to a hierarchy specified by the corresponding DTD, thereby standardizing the data from the data sources of the client applications;

wherein the adapter API further includes a second set of methods for the client applications that that provides consumption logic and methods for automatically exporting data defined in the schema registry, from the database into the client applications using Web services.

12. The system of claim 11 wherein the adapter API includes an XML API comprising the first set of methods and the second set of methods, wherein the first set of methods comprises a Writer API and the second set of methods comprises a Reader API.

13. The system of claim 12 wherein the server further includes a schema generator for generating the schema definition, a DTD generator for generating the DTD, and an adapter software kit that is downloaded from the server and used to incorporate the adapter API into the client applications.

* * * * *